F. LILLER.

Improvement in Ironing-Tables.

No. 5,119. Reissued Oct. 29, 1872.

Witnesses:
Wm. J. Boston.
Albert K. Norris

Inventor:
Frederick Liller.
By James L. Norris.

UNITED STATES PATENT OFFICE.

FREDERICK LILLER, OF BALTIMORE, MD., ASSIGNOR, BY MESNE ASSIGNMENTS, TO STEPHEN MEINETSBERGER AND FRANKLIN W. MERRYMAN.

IMPROVEMENT IN IRONING-TABLES.

Specification forming part of Letters Patent No. 129,042, dated July 16, 1872; reissue No. 5,119, dated October 29, 1872.

*To all whom it may concern:*

Be it known that I, FREDERICK LILLER, of Baltimore, in the county of Baltimore and State of Maryland, have invented a new and useful Improvement in Ironing-Tables, of which the following is a specification:

This invention has for its object to produce an ironing-table that is adapted to be compacted so as to be made to occupy a small space when not in use, the parts composing said article being so combined and arranged as to form a device for the object sought, that can be constructed with ease and facility, and upon an economical plan, the parts constituting the same being connected and braced, when designed for use, in a substantial and rigid manner. The invention consists, among other things, in arranging at one end of a proper-shaped "board," constituting the top of the table, a hinged leg or support adapted to fold inwardly, while upon the other end is secured a leg or support in such a manner as to be detached and replaced with comparative ease and facility, the two supports, when the table is designed for use, being strengthened and braced by a removable connecting-bar in such a manner as to impart to the whole structure firmness and stability, a great desideratum, to resist the usual motions in ironing.

Figure 1:
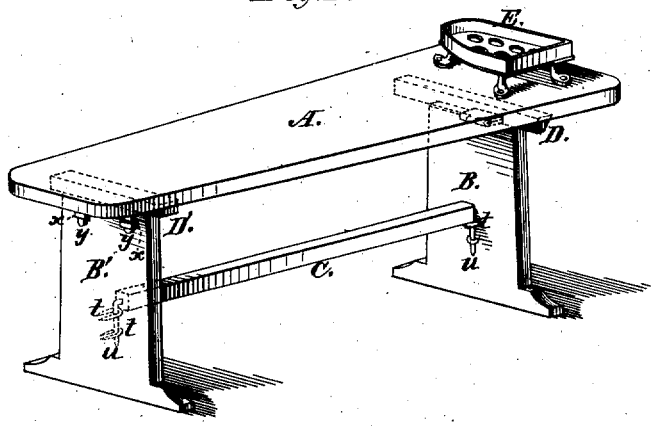
Figure 2:
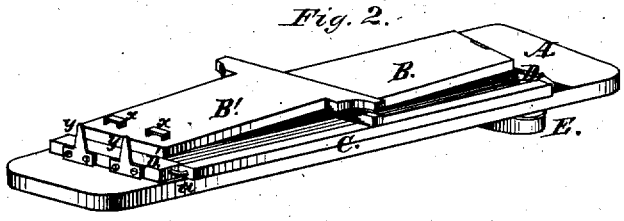
Figure 3:
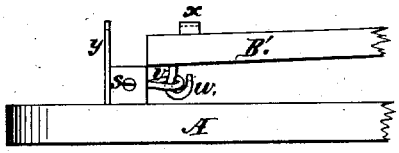

In the drawing, Figure 1 is a perspective view of the improved table as erected; Fig. 2 is an under side perspective view of the same as compacted; and Fig. 3 is a partial edge view of the table as compacted, illustrating the manner of securing the detachable leg.

To enable others skilled in the art to make and use the invention, I will now describe its present construction.

Referring to the accompanying drawing, the letter A designates a table-top, or a "board," of the proper size, form, and dimensions. To the under side of such a "board," constituting the top of the table, is hinged a leg or support, B, in such a manner as to fold inwardly when it is desired to compact the article, while near the other end is arranged a leg or support, B, constructed and united so as to be readily detached or connected when desired. Both the hinged and removable legs are supported as if by a shoulder by cleats or bars D D′, and to which both legs or supports are connected while the parts are in use, as in ironing, or when compacted to reduce it so as to occupy a small space or area. The leg or support B is permanently attached by one or more hinges, E, while in the present instance the leg or support B′ is connected by one or more fingers, *y y*, projecting from a cleat or bar, D′, and one or more staples, *x x*, on the face of the leg or support. The removable leg B′ is adapted to be connected, when placed horizontally on the table top or board A, by a hinged joint so as to be retained upon the table top or "board" A, and in the present instance is shown as capable of such attachment and detachment by a hook, *w*, and staple, *v*. When the removable and the hinged leg or support are arranged at about right angles to the top or board A they are connected together, braced, and strengthened in a substantial manner by a connecting-bar, C, which is so constructed as to be readily attached and detached to the said legs, and impart to the entire structure a firm and solid basis, so as to resist and prevent all rocking of the table during the operation of ironing. In compacting the table the stay-bar C is first detached, then the leg B′. The hinged leg B is then folded down onto the board A, and the leg B′ secured thereon by hook *w* and staple *v*, Fig. 3. The bar C is in the present instance secured by means of sockets *s*, in the ends of the cleats receiving the hooks *u*. E represents an iron stand secured on the top of the board A. The table is compacted as illustrated in Fig. 2. In this condition it may be readily stowed away within a very small space, and when again required it may be in a moment restored by any one to the working condition shown in Fig. 1.

Having thus fully described my invention, what I claim as new, and desire to secure by Letters Patent, is—

1. The "board" A, constituting the top of the ironing table, provided with a hinged support, B, and a detachable support, B′, in combination with each other and with a removable connecting-bar, C, substantially as described, for the purpose specified.

2. The improved ironing-table composed of the "board" A, hinged leg B, detached leg B′, stay-bar C, and cleats D D′, constructed substantially as herein specified.

3. The improved ironing-table composed of the board A, hinged leg B, detachable leg B′, stay-bar C, and cleats D D′, fingers and staples *y x*, hooks and staples *u t* and *w v*, and sockets *s*, with or without the iron stand E, combined substantially as herein shown and described, for the purposes specified.

In testimony that I claim the foregoing I have hereunto signed my name this 8th day of October, 1872.

FREDERICK LILLER.

Witnesses:
BENJN. EGGLESTON,
OLIVER BURKE.